(12) United States Patent
Dong et al.

(10) Patent No.: US 8,107,523 B2
(45) Date of Patent: Jan. 31, 2012

(54) SEGMENTED EQUALIZER

(75) Inventors: Ping Dong, Cupertino, CA (US); Tao Yu, Milpitas, CA (US)

(73) Assignee: Zoran Corporation, Sunnyvale, CA (US)

( * ) Notice: Subject to any disclaimer, the term of this patent is extended or adjusted under 35 U.S.C. 154(b) by 201 days.

(21) Appl. No.: 12/651,980

(22) Filed: Jan. 4, 2010

(65) Prior Publication Data
US 2010/0177817 A1   Jul. 15, 2010

Related U.S. Application Data

(63) Continuation of application No. 11/291,344, filed on Nov. 30, 2005, now Pat. No. 7,649,932.

(51) Int. Cl.
*H04L 27/01* (2006.01)
(52) U.S. Cl. ........................................ 375/233
(58) Field of Classification Search .......... 375/229–234, 375/346, 348, 350; 708/322–323
See application file for complete search history.

(56) References Cited

U.S. PATENT DOCUMENTS

| | | | | |
|---|---|---|---|---|
| 5,692,006 A * | 11/1997 | Ross | | 375/147 |
| 5,777,910 A | 7/1998 | Lu | | |
| 5,778,055 A * | 7/1998 | Paneth et al. | | 379/93.31 |
| 2001/0043650 A1 | 11/2001 | Sommer et al. | | |
| 2005/0190832 A1 | 9/2005 | Ibragimov et al. | | |
| 2006/0088090 A1* | 4/2006 | Azenkot et al. | | 375/233 |

OTHER PUBLICATIONS

Office Action issued for Chinese Patent Application No. 200610172972.4, dated Jan. 12, 2011, 4 pages.

* cited by examiner

*Primary Examiner* — Khanh C Tran
(74) *Attorney, Agent, or Firm* — Fulbright & Jaworski L.L.P.

(57) ABSTRACT

In one embodiment of the present invention, a segmented equalizer includes a plurality of feedforward equalizer segments, each feedforward equalizer segment responsive to delayed samples of an input signal $\{v_n\}$, wherein n is the index of samples, and including a filter block for filtering the delayed samples by using coefficients which are updated based on a step size generated for each equalizer segment.

14 Claims, 11 Drawing Sheets

SEGMENTED EQUALIZER

CROSS REFERENCE TO RELATED APPLICATIONS

This application is a continuation of U.S. patent application Ser. No. 11/291,344, filed on Nov. 30, 2005 now U.S. Pat. No. 7,649,932 by Ping Dong et al. and entitled "SEGMENTED EQUALIZER".

BACKGROUND OF THE INVENTION

1. Field of the Invention

This invention relates generally to the field of adaptive equalizers and more particularly, to adaptive equalizers for reducing multipath effects and self-noise and increasing convergence speed when used in wireless data transmission environments.

2. Description of the Prior Art

Equalizers are frequently used to correct channel linear distortion. In a wireless channel, linear distortions frequently include multipath and fading. This is due to the fact that the received signals often include signal components that are multiply reflected in addition to the line-of-sight signal from the transmitter. Quite often, these multiply reflected signal components do not have constant signal strengths relative to the line-of-the sight signal, or between themselves. These cause fading in the received signal.

Multipath causes fluctuations in channel frequency responses. Fading further makes these fluctuations time varying.

Adaptive equalizers and adaptive decision feedback equalizers are often used to combat these fluctuations in channel frequency responses. For further details of such equalizers, the reader is directed to following references: "Adaptive Filter Theory", Fourth Edition by Simon Haykin, Prentice Hall, 2002 and "Digital Communications", Fourth Edition by John G. Proakis, McGraw-Hill, 2001.

An adaptive finite impulse response (FIR) equalizer, with length N, using Least Mean Square (LMS) update criteria works in the following manner.

With reference to FIG. 1, a conventional LMS equalizer 100 is shown to receive an input signal sample sequence $\{v_n\}$, create multiply delayed versions of the signal samples by delay elements 110, then multiply these multiply delayed signal samples by a set of equalizer coefficients $c_0, \ldots, c_{N-1}$ 131, where N is equalizer length. The results are then summed together, by a summer 115, to form an equalizer filter output sequence $\{y_n\}$. This is shown in the following Filter Equation:

$$y_n = \sum_{i=0}^{N-1} v_{n-i} c_i \qquad \text{Eq. (1)}$$

The output from the equalizer, which is the equalizer filter output sequence $\{y_n\}$, generated by Eq. (1), then goes through a decision device Q 140 to generate the equalizer decision sequence $\{d_n\}$. The equalizer decision together with equalizer filter output is used to produce the equalizer error sequence $\{e_n\}$ by a difference operator 160 according to Error Equation:

$$e_n = d_n - y_n \qquad \text{Eq. (2)}$$

The equalizer error is further scaled by a step size multiplier 150 to form scaled equalizer error. The coefficients of the equalizer are then updated by an update means 120 using the scaled equalizer error and delay line data (from the delay line block 110) according to the Update Equation:

$$c_i^{k+1} = c_i^k + \Delta e_n v_{n-i}, i=0, \ldots, N-1 \qquad \text{Eq. (3)}$$

Where $v_{n-i}$'s are equalizer delay line signal samples, $e_n$ is equalizer error, and $\Delta$ is step size for equalizer coefficients update. $c_i^k$'s (same as $c_i$'s) and $c_i^{k+1}$'s are current set and next set of equalizer coefficients.

FIG. 2 shows a higher level block diagram of the equalizer 100 of FIG. 1 wherein an equalizer filter and update block 290 includes a delay block 240, which is the same as the delay elements 110 in FIG. 1, Equalizer Filter block 210 is the same as multiplying by the set of equalizer coefficients $c_0, \ldots, c_{N-1}$ and summation 130 of FIG. 1, the coefficient update block 230 is the same as the update means 120 of FIG. 1. The decision device Q 220 is the same as the decision device Q 140 of FIG. 1 and the difference operator for error formation 260 and error multiplier 250, by step size, are the same as 160 and 150, respectively in FIG. 1.

An adaptive decision feedback equalizer (DFE) using LMS update criteria works in a similar way. Now, the three key equations corresponding to Eqs. (1)-(3) are as following for time index n:

Filter Equation:

$$y_n = \sum_{i=0}^{N-1} v_{n-i} c_i + \sum_{i=1}^{B} d_{n-i} b_i \qquad \text{Eq. (4)}$$

Error Equation:

$$e_n = d_n - y_n \qquad \text{Eq. (5)}$$

Update Equations:

$$c_i^{k+1} = c_i^k + \Delta_{\!f} e_n v_{n-i}, i=0, \ldots, N-1 \qquad \text{Eq. (6)}$$

$$b_k^{k+1} = b_i^k + \Delta_{\!fb} e_n d_{n-i}, i=1, \ldots, B \qquad \text{Eq. (7)}$$

Where N is equalizer length for the feedforward part, B is equalizer length for the feedback part, $v_{n-i}$'s are equalizer delay line samples, $d_{n-i}$'s are delayed equalizer decisions, $c_i$'s are equalizer feedforward coefficients, $b_i$'s are equalizer feedback coefficients, $e_n$ is equalizer error, and $\Delta_{\!f}$ and $\Delta_{\!fb}$ are coefficients updates step sizes for feedforward and feedback parts respectively. $c_i^k$'s (same as $c_i$'s), $b_i^k$'s (same as $b_i$'s) and $c_i^{k+1}$'s, $b_i^{k+1}$'s are current and next sets of equalizer feedforward and feedback coefficients.

FIG. 3 shows an exemplary conventional decision feedback equalizer 300 including a decision feedback equalizer filter and update block 330 and a feedforward filter and update block 320. The decision feedback equalizer filter and update block 330 is shown to perform filter function, which is performed by the DFE Filter 302 using feedback coefficients from a decision feedback equalizer coefficient update function 304 and the previous equalizer decision outputs $\{d_n\}$ stored in delay line 303. The block 304 is shown to update equalizer feedback coefficients using equalizer error $\{e_n\}$ scaled by a feedback step size $\Delta_{\!fb}$ using multiplier 306 as well as previous output of the equalizer decision stored in delay line 303. The feedforward filter and update block 320 similar to block 290 of FIG. 2 is shown to perform filter function by FFE filter 312 using sample inputs $\{v_n\}$ stored in Delay Line 313, and feedforward coefficients from a FFE Update block 314. The feedforward equalizer update block 314 is similar to the block 230 of FIG. 2 for updating equalizer feedforward coefficients.

A feedforward step size multiplier 308 provides scaled equalizer error by feedforward step size $\Delta_f$ to the coefficient update function 314. Similarly, the feedforward filter block 312 is similar to the block 210 of FIG. 2 and its output is provided to a summer 316 for a summation operation with the output of the block 330 and the result of the summation operation, at the output of the summer 316, represented by $\{y_n\}$, is provided to a equalizer decision block Q 310, which is similar to the block 220 of FIG. 2. The output of the summer 316 is also provided to a difference operator 318 to produce equalizer error $\{e_n\}$. Eq. (4) is implemented by function 312 in block 320, function 302 in block 330 and summer 316, Eq. (5) is implemented by the difference operator 318, Eq. (6) is implemented by the function 314 in block 320, and Eq. (7) is implemented by function 304 in block 330.

When input signal sample data $\{v_n\}$ are sampled at symbol clock rate, the equalizer is called symbol spaced equalizer. When data $\{v_n\}$ are sampled at a clock rate faster than symbol clock, it is called fractionally-spaced equalizer. The sample data, equalizer decisions, and coefficients, can be real or complex.

Besides LMS coefficients updating scheme, there are other coefficients updating schemes such as zero-forcing (ZF), recursive least square (RLS), etc.

After initial convergence, an equalizer needs to continuously update its coefficient to track possible changes in channel response. In multipath and fading environment, channel response can change quite fast.

In the current field of the art, equalizers are typically implemented using devices with finite operating precision in its delay line samples and coefficients. The equalizer typically has finite precision in its filtering and updating operations including multiply-and-accumulation (MAC). This problem of finite precision implementation creates additional noise at the equalizer filter output. This noise is called quantization noise.

During the initial convergence stage and later tracking stage, the equalizer coefficients are moving around their theoretical optimal values. Because of this variation and deviation from their optimal values, the performance of the equalizer differs from its optimal value. This non-optimal feature creates another additional noise at the equalizer filter output. This noise is called self-noise for the equalizer.

Self noise and quantization noise are the two noise factors that reduce the equalizer performance from the theoretically achievable optimal equalizer performance. They affect both initial convergence and steady state performances.

The performance requirement of an adaptive equalizer depends on the channel conditions, output signal to noise ratio (SNR) requirement, as well as converging speed requirement. These requirements determine equalizer length, updating step sizes, and the precisions of its coefficients as well as filter operations. All of these directly affect the cost of implementing the equalizer.

The equalizer's length determines its time span. On one hand, a longer equalizer gives better theoretic steady state performance assuming the coefficients reached their theoretical optimal state. On the other hand, a longer adaptive equalizer requires a smaller step size under the same channel condition. A smaller step size normally results in slower converging speed. Therefore a longer adaptive equalizer has slower converging speed.

For the same step size and channel condition, a longer equalizer generates more self-noise because more coefficients are in non-optimal state.

A longer equalizer also requires larger precision in its coefficients and operations. This is because each of the quantized coefficients and operations contributes a little to the equalizer's quantization noise, and the total contribution to the quantization noise due to coefficient and operation quantization is the sum of each individual contribution. Therefore, in a conventional equalizer structure, the longer the equalizer is, the more severe the quantization noise becomes for the same individual coefficient and operation quantization level. Equivalently, to keep the overall quantization noise level to a desired level, higher coefficient and operation precision is required for a longer equalizer.

A known scheme referred to as Block Floating Point (BFP), as discussed in the publication "Implementation Options for Block Floating Point Digital Filters" by K. Raley and P. Bauer, 1997 IEEE International Conference on Acoustics, Speech, and Signal Processing (ICASSP'97)—Volume 3 p. 2197, is intended to mitigate the impact of finite precision operations and quantization in data and coefficients. For a true floating point data representation, a value is represented as a mantissa part and an exponent part to represent values with large dynamic range with reasonable quantization precision. BFP uses an exponent for a block of values to achieve similar advantage. BFP essentially use a dynamic scaling for a block of data before quantization to improve the quantization performance.

When an equalizer is implemented in BFP with block size L and number of blocks M, the set of adaptive equalizer equations corresponding to Eqs. (1)-(3) for time index n become:

Filter Equation:

$$y_{n,m} = \sum_{i=0}^{L-1} v_{n-i,m} c'_{i,m} \qquad \text{Eq. (8)}$$

The outputs from all blocks are combined using Combination Equation, Eq. (9):

$$y_n = \sum_{i=0}^{M-1} y_{n,m}(a^{j_m})^{-1} \qquad \text{Eq. (9)}$$

Where $c'_{i,m} = c_{i,m} a^{j_m}$, a is the base for the BFP operation, $j_m$ is the exponent part for block m, and $a^{j_m}$ is the equivalent scaling for block m, and its inverse $(a^{j_m})^{-1}$'s is the combination weighting for block m in forming the equalizer output.

The coefficients Update Equation becomes:

$$c'^{k+1}_{i,m} = c'^{k}_{i,m} + \Delta a^{j_m} e_n v_{n-i} \; i=0,\ldots,L-1, \; m=0,\ldots,M-1 \qquad \text{Eq. (10)}$$

During the initial convergence and later on tracking, $j_m$'s are varying, therefore corresponding monitoring and changing in those equations are necessary.

In general, an equalizer implemented using BFP has better trade off between cost and quantization noise. This approach often leads to a lower overall implementation cost of an adaptive equalizer for the desired quantization noise performance. However, because the effect of Eqs. (8)-(10) are mathematically equivalent to Eqs. (1),(3) except in numerical system representation, the dynamic behavior of an adaptive equalizer implemented using BFP is not changed. Specifically, BFP implementation does not affect the equalizer's self noise, converging speed, or tracking behavior.

In the multipath environment, only some of the equalizer coefficients have significant values and others have zero or near zero values. Fading further makes the values and the locations of those significant coefficients time varying. Over time, some of the previously significant coefficients may become zero or near zero and new significant coefficients may emerge.

For conventional equalizers implementation, these features of multipath and fading environment are not utilized. The equalizers' behavior in converging speed and self-noise are not affected by multipath and fading. This also includes the equalizers implemented using BFP even though such equalizers using BFP might have improved the equalizers' quantization behavior.

Sparse equalizers, discussed in U.S. Pat. No. 5,777,910, entitled "Sparse equalization filter adaptive in two dimensions" issued on Jul. 7, 1998 to Cheng-Youn Lu, are introduced to combat problems associated with conventional equalizers. An example of a conventional sparse decision feedback equalizer 400 is provided, in block diagram form, in FIG. 4. A sparse equalizer tries to concentrate its coefficients to a set of effective coefficient locations that have significant values, and remove all "near zero" coefficients. In FIG. 4, this is done by use of the switches 402 and 408, controlled by switch control block 420. The purpose of switches 402 and 408 is to select only those delayed data from FFE Delay 401 and DFE Delay 407 that correspond to the significant equalizer coefficients. Only the significant equalizer coefficients are implemented and therefore effective. All other coefficients are set to zero and not implemented. Doing so reduces the number of required coefficients because the FFE filter block 403 and the FFE update block 404 as well as the DFE filter block 409 and the DFE update block 410 only need to process the effective coefficients, therefore, at least in theory, there is a reduction of the converging speed, self noise, and quantization noise problems mentioned above. These features of the sparse equalizer make it particularly suitable for stationary multipath environment where relatively few effective coefficients are required and the locations of those effective coefficients do not change quickly. A sparse equalizer with relatively few effective coefficients should, at least in theory, behave like a smaller equalizer. So the problems in converging speed, quantization noise, and self noise are all improved compared with a conventional equalizer with the same time span. At the same time, the total implementation cost of a sparse equalizer may also be smaller compared with a conventional equalizer with the same time span.

Two schemes are needed to implement a sparse equalizer, which is discussed in the Cheng-Youn Lu reference, indicated above. One scheme, not shown in FIG. 4, is to determine where to allocate the effective coefficients, and the other scheme is to implement switching mechanisms shown as 402 and 408 to apply those effective coefficients to generate an equalizer output.

The first scheme requires one to either sequentially learn the locations of those effective coefficients or to periodically initialize those effective locations using some training sequence. Sequentially learning the effective locations will significantly slow down the convergence and tracking behavior of the equalizer. Periodical initialization using a training sequence reduces the effective channel bandwidth, adds additional costs to implementation of the equalizer, and reduces the tracking capability and overall performance if the channel changes between training sequences. Both approaches of selecting the effective coefficient locations involve additional cost compared with conventional equalizer implementations.

The second scheme requires significantly adding complexity in the equalizer's implementation. Suppose the equalizer has 500 total possible locations for the coefficients yet there are 100 effective coefficients, then the equalizer needs a circuit that can dynamically switch the 100 effective coefficients into any 100 of those 500 locations. This requirement on dynamic switching capability together with the requirement on selecting effective coefficient locations significantly offsets cost savings due to a reduced number of effective coefficients.

Fading in a multipath environment further complicates the problem for sparse equalizers. For it now has to dynamically allocate its coefficients. Fading causes the signal strength to change in both absolute terms and in relative terms between each signal path of the multipath signal. When the multipath environment changes, the effective coefficient allocations have to change accordingly and immediately. Otherwise, the sparse equalizer suffers significant performance loss.

Because a sparse equalizer has to either periodically reallocate its coefficients or sequentially try each of the possible locations to see whether or not significant equalizer coefficients are needed in those locations, both of these methods significantly slow down the tracking ability of a sparse equalizer. Therefore, a sparse equalizer performs inadequately in combating dynamic multipath and fading channel, and at the same time adds to the cost of implementation of an equalizer.

Therefore, for the foregoing reasons, the need arises for an adaptive equalizer having fast convergence time, low self-noise and lower implementation or manufacturing costs.

SUMMARY OF THE INVENTION

Briefly, a segmented equalizer including a plurality of equalizer segments is disclosed in accordance with one embodiment of the present invention. Each equalizer segment includes means to store delayed samples, means for filtering the delayed samples by using coefficients, means for updating those coefficients, and means to manage an updating step size generated for each equalizer segment.

These and other objects and advantages of the present invention will no doubt become apparent to those skilled in the art after having read the following detailed description of the preferred embodiments illustrated in the several figures of the drawing.

IN THE DRAWINGS

FIG. 5(*a*) shows further details of an equalizer segment of the equalizer 500 of FIG. 5.

FIG. 5(*b*) shows a block floating point equalizer segment.

FIG. 8(*a*) shows further details of an equalizer segment for the sparse equalizer 800 of FIG. 8.

DETAILED DESCRIPTION OF THE PREFERRED EMBODIMENT

The present invention generally describes an adaptive equalizer particularly suitable for multipath and fading channels frequently seen in wireless data transmission environments. The equalizer comprises a group of equalizer segments working independently of each other. The outputs of these equalizer segments are combined under some weighting to form a final equalizer output. This equalizer, particularly when used in multipath and fading environments, has faster convergence, less self-noise and quantization noise, and lower implementation cost.

An example of an adaptive equalizer of the present invention is shown and discussed relative to the various embodiments of the present invention, however, it should be understood that these figures and discussion are merely examples of the present invention and other implementations or forms of equalizers are anticipated without departing from the scope and spirit of the present invention. One such example is a FIR LMS equalizer. Applications to other types of updating schemes such as ZF and RLS as well as DFE are anticipated and not discussed in detail, as these schemes are well known in the art.

Figure 1:
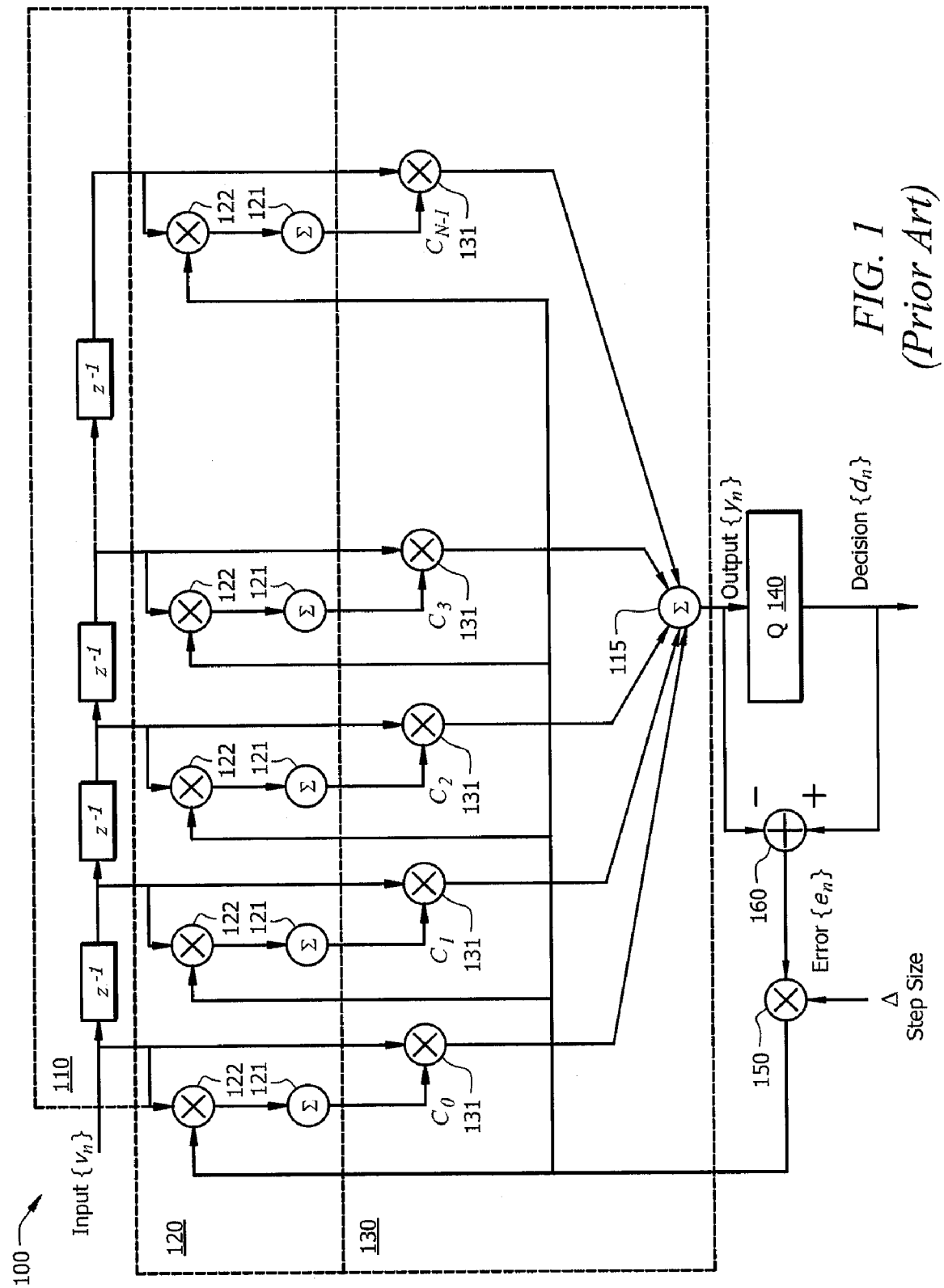
FIG. 1 shows a prior art equalizer 100, in block diagram form.
Figure 2:
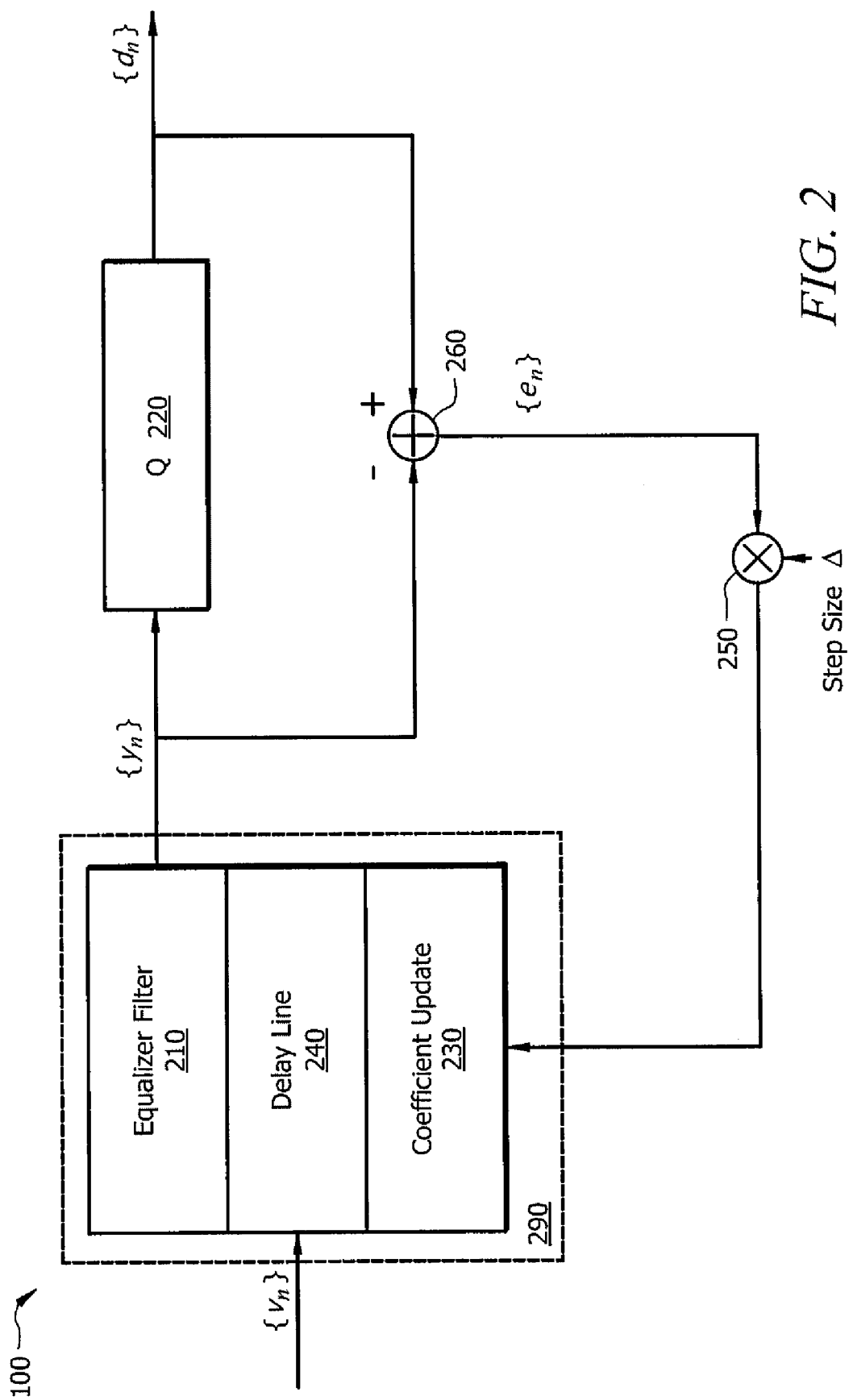
FIG. 2 shows a higher level block diagram of the equalizer 100 of FIG. 1.
Figure 3:
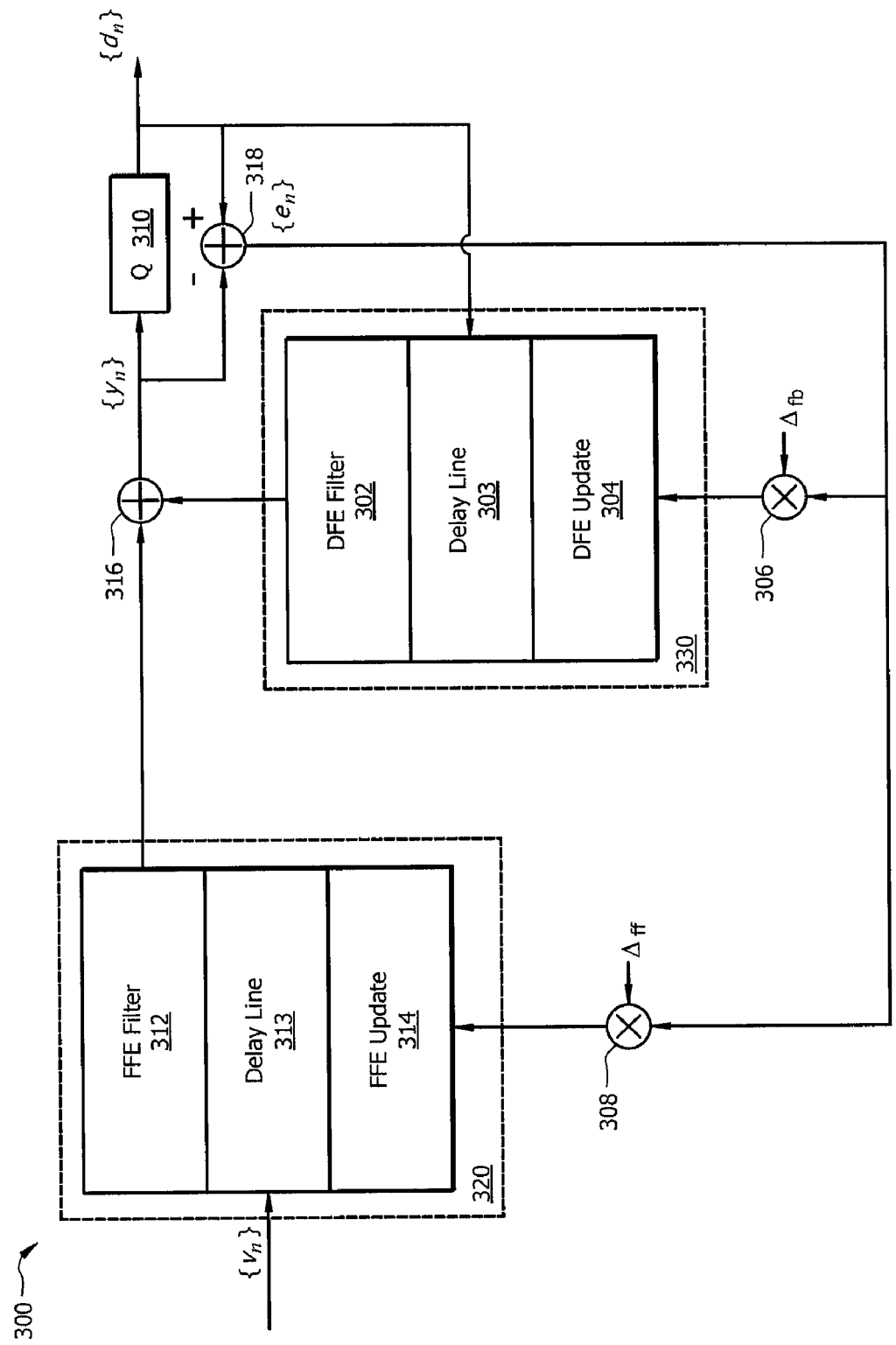
FIG. 3 illustrates an exemplary prior art decision feedback equalizer 300.
Figure 4:
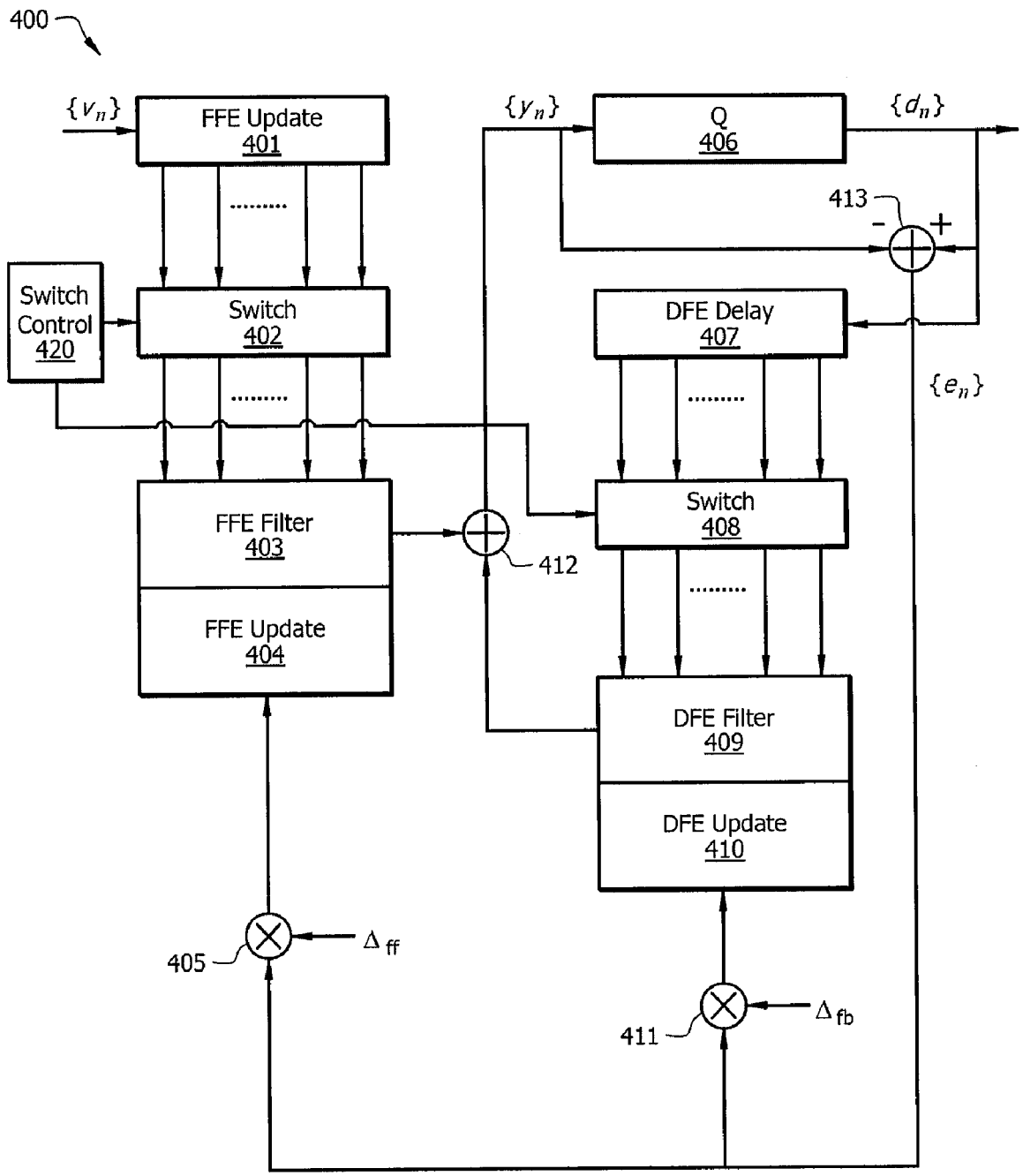
FIG. 4 shows an example of a prior art sparse decision feedback equalizer 400, in block diagram form.
Figure 5:
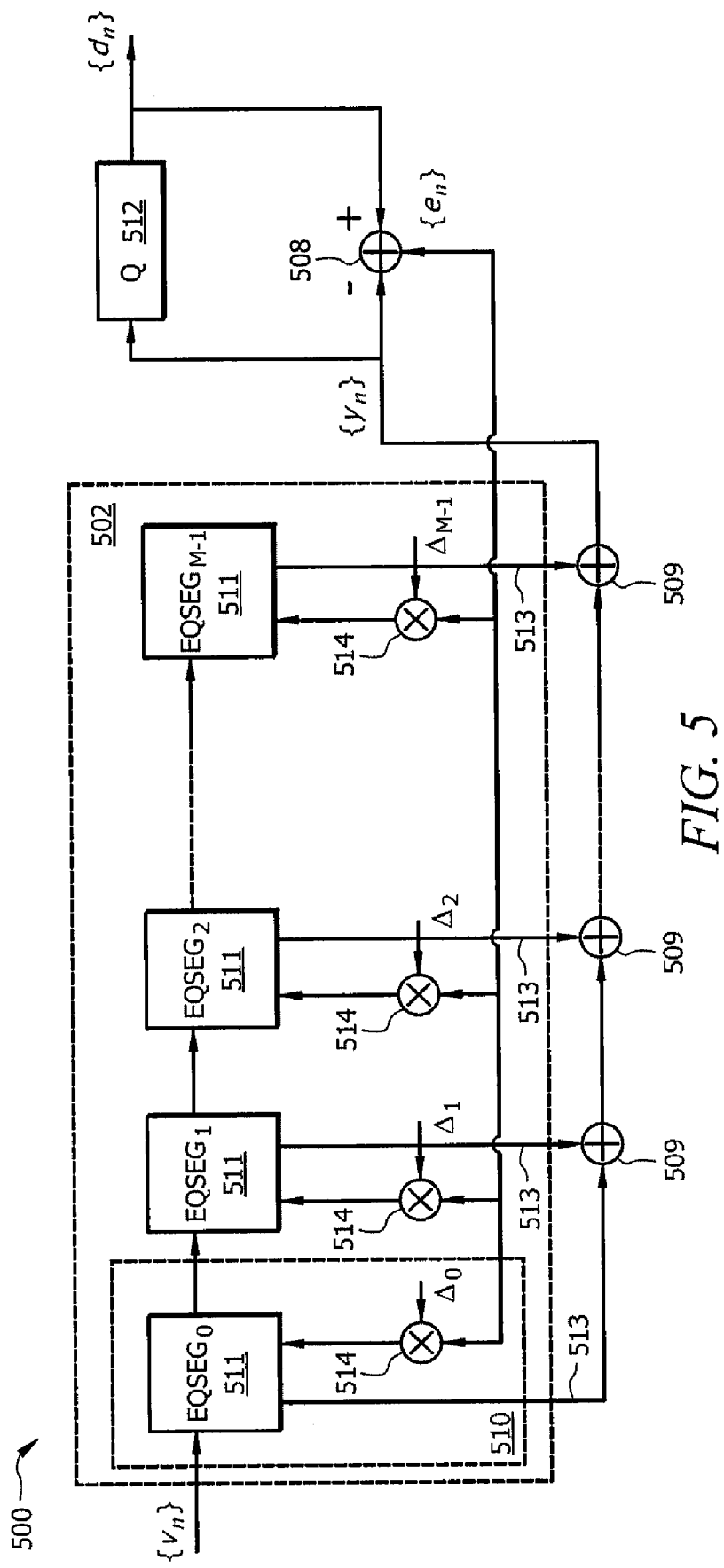
FIG. 5 shows an adaptive segmented equalizer 500, in accordance with an embodiment of the present invention.
Figure 5A:
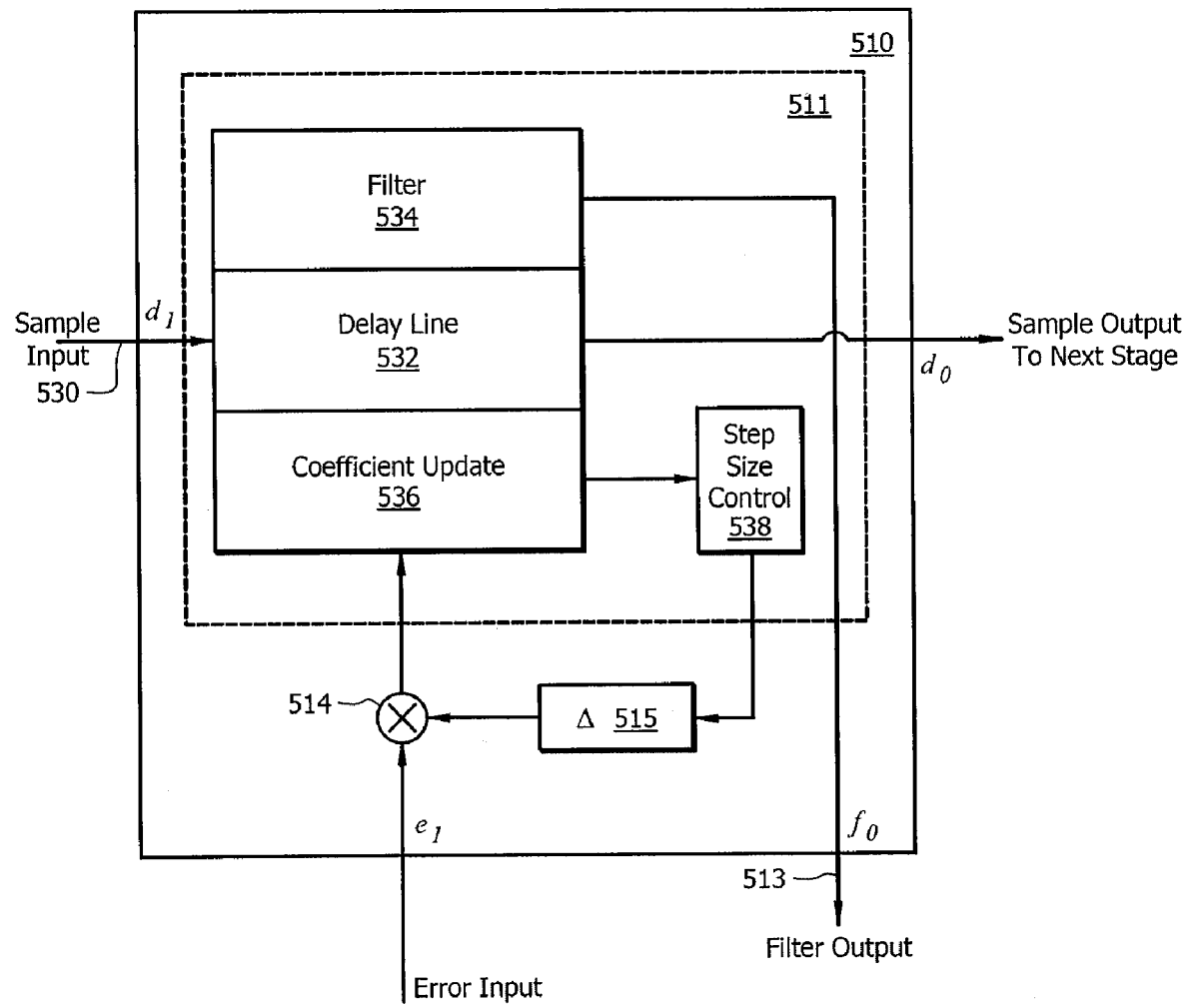

Referring now to FIG. 5, an adaptive segmented equalizer 500 is shown, in accordance with an embodiment of the present invention, to include a plurality of feedforward equalizer segments 502, comprising of an feedforward equalizer segment 510, a plurality of summers 509 ("adder" and "summer" are used interchangeably herein and are intended to refer to the same structure and function), a difference operator 508, and a decision block Q 512. Referring to FIG. 5(a), each of the equalizer segments 510 is shown to include a multiplier 514 and an equalizer segment block 511, a step size control block 538 and a step size block 515. The delayed sample output $d_o$ is fed to the next equalizer segment block and the filtered output $f_o$ is fed to the summer 509 of FIG. 5.

Each one of the multipliers 514 of the equalizer segments 510 is shown to receive a step size Δ from the step size control block 538, and an error value, denoted by $\{e_n\}$, which are multiplied to generate one of the inputs of the coefficient update block 536 in block 511. There are M number of step sizes and blocks 511 shown with M being an integer value. Each of the equalizer segments 510 with one of the plurality of summers to which input is provided by a corresponding equalizer segment block 511 is referred to as an equalizer stage. Thus, there are M number of equalizer stages shown in FIG. 5. In an exemplary embodiment, the equalizer 500 of FIG. 5 is of an LMS type of equalizer although other types of equalizers may be employed.

The first equalizer segment 510 is shown to receive an input sequence $\{v_n\}$ with n being a time index of samples of an input v. The input $\{v_n\}$ is provided to the equalizer segment block 511 of the first equalizer segment 510. As earlier indicated, a delayed sample output of each of the equalizer segment blocks 511 is provided as input to the next equalizer segment block 511 and the filter output of the equalizer segment block 511, the equalizer segment filter output 513, is provided as input to a summer 509 of the same stage of equalizer segments except that the equalizer segment filter output 513 of the first stage of the equalizer segment 511 is provided to the summer 509 of the next stage. The output of each of the summers 509 is received as input by the summer 509 of a next equalizer stage with the output of the last stage summer being the equalizer filter output $\{y_n\}$, which is generated in accordance with Eq. (11) below. Each of the blocks 511 includes structures for performing equalizer segment filter and a coefficient update functions as well as step size control function. The output $\{y_n\}$ is provided as input to the difference operator 508 as well as decision block Q 512. The decision output $\{d_n\}$ of the decision block Q 512 is provided as another input to the difference operator 508 wherein $\{y_n\}$ is subtracted from $\{d_n\}$ according to Eq. (13) below to generate the error $\{e_n\}$, which serves as input to the various stages of the equalizer segments for coefficient update. The output $\{y_n\}$ serves as input to the block Q 512 where it is quantized, in accordance with known decision schemes, generating the decision output $\{d_n\}$ of the equalizer 500.

In FIG. 5, the adaptive equalizer 500 is segmented and the entire equalizer is first divided into some pre-determined number of segments 510. Each of these equalizer segments 510 operates as if it is an independent equalizer. All equalizer segments 510 utilize the common equalizer error, i.e. $\{e_n\}$, for coefficients updates. Received data, $\{v_n\}$ goes through these equalizer segments 510 sequentially. The outputs of the equalizer segments 510 are then combined to form the equalizer filter output $\{y_n\}$, and then placed through the decision block Q 512 to form the equalizer decision output $\{d_n\}$. One important aspect is that each of the equalizer segments 510 has its own updating step size $\Delta_m$ for coefficient update of the corresponding segment for m ranging from 0 to M−1.

Using the same notation as in Eqs. (1)-(3), the Filter Equation for each of the equalizer segments 510 for time index n is:

$$y_{n,m} = \sum_{i=0}^{L-1} v_{n-i,m} c_{i,m} \qquad \text{Eq. (11)}$$

Where m, ranging from 0 to M−1, is the segment index, M is the number of segments in the equalizer, and L is the segment size. For now, assume all segments have the same segment size L. 'i' is a sum index used in the summation of the multiplication results of $v_{n-i,m} c_{i,m}$. The outputs of the equalizer segments 510 are then combined to form the equalizer filter output according to the Combination Equation:

$$y_n = \sum_{m=0}^{M-1} y_{n,m} \qquad \text{Eq. (12)}$$

The Error Equation is:

$$e_n = d_n - y_n \qquad \text{Eq. (13)}$$

The Update Equation is:

$$c_{i,m}^{k+1} = c_{i,m}^k + \Delta_m e_n v_{n-i,m}, \; i=0, \ldots, L-1, \; m=0, \ldots, M-1 \qquad \text{Eq. (14)}$$

Where $\Delta_m$ is the updating step size for segment m, and it is applied to each of the $c_{i,m}$ belonging to segment m.

In FIG. 5, the segmented equalizer 500 comprises of a group of smaller equalizers, i.e. equalizer segments 510, with their outputs combined to form a single equalizer output, and using a common error for coefficients update for all equalizer segments 510.

An important advantage of the segmented equalizer, of FIG. 5, is that there are different converging speeds and self noise behaviors for each of the equalizer segments 510. In this manner, each step size Δ, for each of the equalizer segments 510 is used to achieve desired behaviors for the corresponding equalizer segment 510. For instance, if the step sizes corresponding to the effective coefficient locations as defined in a sparse equalizer are set to 'non-zero' values and for all others are set to zeroes, then the segmented equalizer will have the similar dynamic behavior as a sparse equalizer.

In a typical multipath and fading environment, the locations of the effective coefficients vary over time. Effective coefficients are those equalizer coefficients that have significant values, while non-effective coefficients are those that are zero or near zero. So, in our segmented equalizer, it is not desirable to actually set the step sizes corresponding to non-effective coefficient locations to zero. Some smaller step sizes are used for those segments to enable coefficients $c_{i,m}^k$ to adapt to possible channel changes.

A practical arrangement is to set the step size, $\Delta$, for each equalizer segment 510 according to the largest magnitude of coefficients in that segment. That is, the larger the magnitude, the larger the step size for that segment. Accordingly, equalizer segments with larger magnitude of coefficients generate larger step sizes to effectuate faster converging and tracking speed, while segments with smaller magnitudes generate smaller step sizes to effectuate smaller self noise. Since there are relatively few equalizer segments with large coefficient magnitudes in a multipath environment, this approach enables an equalizer, such as the equalizer 500, to have faster converging speed while generating smaller overall self noise, and having better tracking behavior to handle channel changes caused by fading.

One of the applications of the embodiment of FIG. 5 and other embodiments of following figures is in the terrestrial digital television transmission area, however, other wireless data transmission applications are anticipated.

FIG. 5(a) shows further details, in block diagram form, of one of the feedforward equalizer segments 510 of FIG. 5. In accordance with an embodiment of the present invention, the equalizer segment 510 is shown to include the equalizer segment block 511 and the multiplier 514. The equalizer segment block 511 is shown to receive sample input $d_i$, which may be $\{v_n\}$ if the block 511 is in the first stage of the segmented equalizer 500 or the output of the previous equalizer segment stage. The multiplier 514 is shown to generate input to the block 511 and to receive two inputs, one being the error input or $e_i$ and another being the step size $\Delta$. The outputs of the equalizer segment 510 are generated by the block 511 and are delayed sample output $d_o$ and filter output $f_o$. The former is provided, as input, to the next stage equalizer segment 510 of the segmented equalizer 500 and the latter is the equalizer segment filter output 513 of FIG. 5, provided to the summers 509, as previously discussed relative to FIG. 5.

In FIG. 5(a), the block 511 is shown to include a delay line block 532, a filter block 534, a coefficient update block 536, and a step size control block 538 in accordance with an embodiment of the present invention. The delay line block 532 provides input to the filter block 534 for filtering, and also to the block 536 for coefficient updating. The coefficients of the block 536 are used as input by the block 538 to generate the step size $\Delta$ for use by the multiplier 514 in accordance with the above-noted equations, as discussed relative to FIG. 5. The step size $\Delta$ is stored in the step size block 515 after it is provided by the control block 538 and prior to being multiplied by the multiplier 514. The output of the multiplier 514 is shown provided as another input to the block 536 for coefficient update.

The delay line block 532 receives sample input $d_i$ as its input, which is either the input of the segmented equalizer 500, $\{v_n\}$, if the block 511 is in the first stage of the equalizer or the delayed sample output $d_o$ of the previous stage equalizer segment block 511. The filter block 534 performs filtering operation in accordance with Eq. (11). Such filtering is performed using the coefficients generated by the coefficient update block 536. The equations implemented by the filter block 534 and the coefficients update block 536 are the same as those discussed relative to FIG. 5. The coefficients generated by the block 536 are also used to generate the step sizes through the step size control block 538. It is important to note that one step size is generated for each equalizer segment. The number of equalizer coefficients in each equalizer segment in the segmented equalizer 500 can vary and can be as small as one. Different equalizer segments do not necessarily have to have the same number of coefficients. Each equalizer segment may have different internal structure.

Figure 5B:
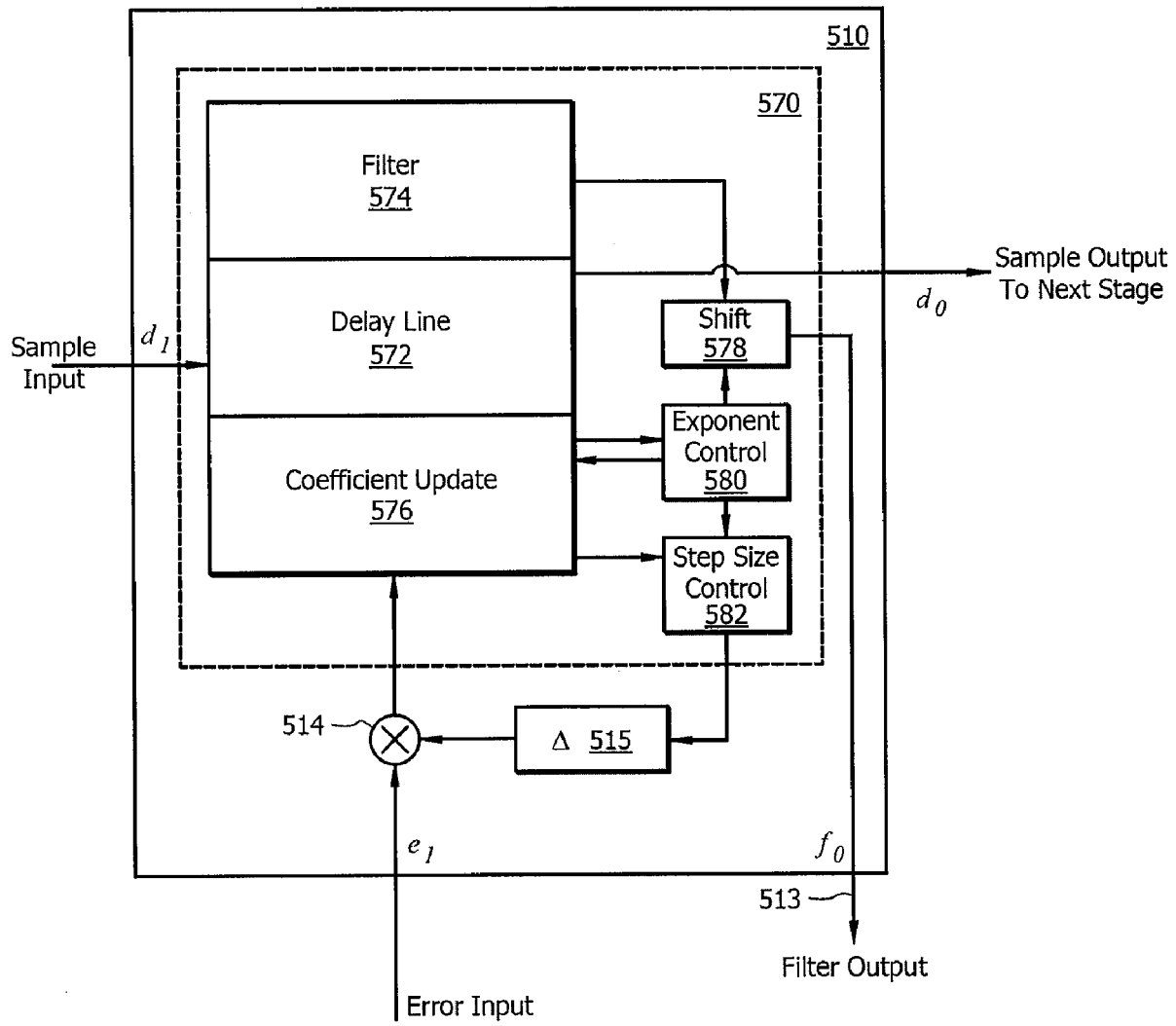

As previously noted, other types of equalizer segment block 511 may be employed in the spirit of the present invention. It is convenient to treat each segment as a block in a Block Floating Point (BFP) implementation of the equalizer. In this connection, FIG. 5(b) shows the equalizer segment block 511 to include a BFP equalizer segment block 570 and the multiplier 514 in accordance with another embodiment of the present invention. The segment block 570 is shown to receive the same input as that of the block 511 in FIG. 5(a), i.e. sample input $d_i$ and to generate delayed sample output to the next stage equalizer segment. The block 570 is plugged in, along with a plurality of other similar blocks, to make up the plurality of equalizer segments 502 of FIG. 5.

The block 570 is shown to include a delay line block 572, a filter block 574, a coefficient update block 576, a shift block 578, an exponent control block 580 and a step size control block 582.

The block 572 is structurally and functionally the same as the block 532 of FIG. 5(a), as is the block 574 the same as the block 534. However, the output of the filter block 574 of FIG. 5(b) is provided, as input, to the shift block 578, which also receives input from the exponent control block 580 and the output of the shift block 578 becomes the filter output 513. The exponent control block 580 monitors the coefficients in the coefficients update block 576 and provides control to exponent part of the coefficients. The block 580 also provides input to the step size control block 582 with the latter receiving, as input, an output of the block 576 for coefficient magnitude information, similar to the segment 511 of FIG. 5(a). The blocks 578 and 580 cause the block floating point effect on segment filter output 513, and operate in a manner consistent with the equations Eqs. (15)-(16) provided below.

In FIG. 5(b), BFP is applied to the segmented equalizer 500 to improve the quantization noise performance and to reduce the implementation cost. In one embodiment of the present invention, one common exponent is utilized for each of the equalizer segments 570 and shifter 578 removes the effect of the exponent when the segment outputs are being added together by the summers 509 of FIG. 5. The shifter 578 is shown to be coupled to the blocks 574 and 580 receiving input from both and generating the filter output 513. It is often enough to apply BFP to the coefficients part only so that the mantissa parts of the coefficients from different segments have roughly the same magnitude with different exponents in each segment varying. For those skilled in the art, application to both coefficients and delay line data is straightforward. The equations defining the various functions related to the segment 510 and the equalizer in which it is used are set forth below as Eqs. (15)-(18) relative to FIG. 5.

For each of the equalizer segments, which includes a filter block 574, similar to the block 534, and uses a BFP feedfor ward equalizer segment, the function defined by a Segment Filter Equation below, is:

$$y_{n,m} = \sum_{i=0}^{L-1} v_{n-i,m} c'_{i,m} \qquad \text{Eq. (15)}$$

The output Combination Equation, i.e. generation of equalizer filter output $\{y_n\}$ is:

$$y_n = \sum_{m=0}^{M-1} y_{n,m} (a^{j_m})^{-1} \qquad \text{Eq. (16)}$$

Where $c'_{i,m} = c_{i,m} a^{j_m}$, a is the base for the BFP operation, $j_m$ is the exponent part for segment m. Note that $a^{j_m}$ is the equivalent scaling for segment m, and its inverse $(a^{j_m})^{-1}$'s implemented by block 578 are combination weighting for segment m in forming the equalizer filter output $\{y_n\}$.

The output $\{y_n\}$ from the segmented equalizer then goes through the decision block Q 512 to form the equalizer decision output $\{d_n\}$. The equalizer decision $\{d_n\}$ together with equalizer filter output $\{y_n\}$ forms the equalizer error according to Error Equation:

$$e_n = d_n - y_n \qquad \text{Eq. (17)}$$

The coefficients Update Equation is implemented by the coefficient update block 576 and step size control block 582 of each segment of each stage and is:

$$c'_{i,m}{}^{k+1} = c'_{i,m}{}^{k} + \Delta_m a^{j_m} e_n v_{n-i}, i=0, \ldots, L-1, m=0, \ldots, M-1 \qquad \text{Eq. (18)}$$

Each of these equalizer segments operates as if it is a block in a block floating point implementation that shares a common exponential element controlled by block 580. During the initial convergence and later tracking, the exponent $j_m$ for each of the segments may change. Corresponding monitoring and changing are necessary, similar to BFP implementation.

In comparing Eqs. (15), (16), (18) with Eqs. (8), (9), (10), the important difference is that for a segmented equalizer each segment uses a different coefficient update step size $\Delta_m$, while for a conventional equalizer with BFP implementation, all blocks use the same coefficient update step size $\Delta$. This difference causes dramatic changes in the equalizer's dynamic behavior.

Note that in Eqs. (16), (18) the update step size $\Delta_m$ and weighting $(a^{j_m})^{-1}$ for each equalizer segment work independently, so the converging speed as well as the contribution to the total equalizer noise due to coefficient update self-noise and due to coefficient and operation quantization is different for each equalizer segment. Therefore, it is possible to select a proper set of parameters for each equalizer segment so that the overall equalizer is faster in convergence as well as has less self-noise due to coefficient update or due to coefficient quantization.

In general, we would like a segment to have larger update step size if the maximum coefficient magnitude for that segment is large. Large maximum coefficient magnitude corresponds to large $j_m$. Therefore, we can adjust $\Delta_m$ according to $j_m$, using larger $\Delta_m$ for larger $j_m$, and smaller $\Delta_m$ for smaller $j_m$.

It is also possible to set $\Delta_m = \Delta_c (a^{j_m})^{-1}$, where $\Delta_c$ is a predetermined constant step size. This way, Eq. (18) becomes $$c'_{i,m}{}^{k+1} = c'_{i,m}{}^{k} + \Delta_c e_n v_{n-i}, i=0, \ldots, L-1, m=0, \ldots, M-1 \qquad \text{Eq. (19)}$$

The segmented equalizer 500 including the block 570 that implements Eq. (19) is simpler to implement than a conventional equalizer implemented in BFP. The segmented equalizer 500 implemented this way has dramatically different performance compared to a conventional equalizer because each segment has different converging, tracking, and noise behavior. The segmented equalizer 500 is less expensive compared to a conventional equalizer implemented using BFP, and has all benefits of BFP in terms of quantization noise, and at the same time has faster converging speed, and less self noise. Therefore, it is best suited for multipath and fading environments.

In multipath and fading environments, there are only a few significant equalizer coefficients and therefore, in a segmented equalizer, there are few segments with large step sizes and the rest of the segments have small step sizes. In this manner, the whole equalizer has only a few effective coefficients. This significantly improves the initial convergence and later on tracking performance of the equalizer, similar to a sparse equalizer. This also significantly improves the self noise performance since most of the coefficients have small updating step sizes. At the same time, the segmented equalizer removes the possibility of selecting the wrong set of effective coefficients as is possible in a sparse equalizer. Therefore, the segmented equalizer works very well in a multipath and fading environment.

Figure 6:
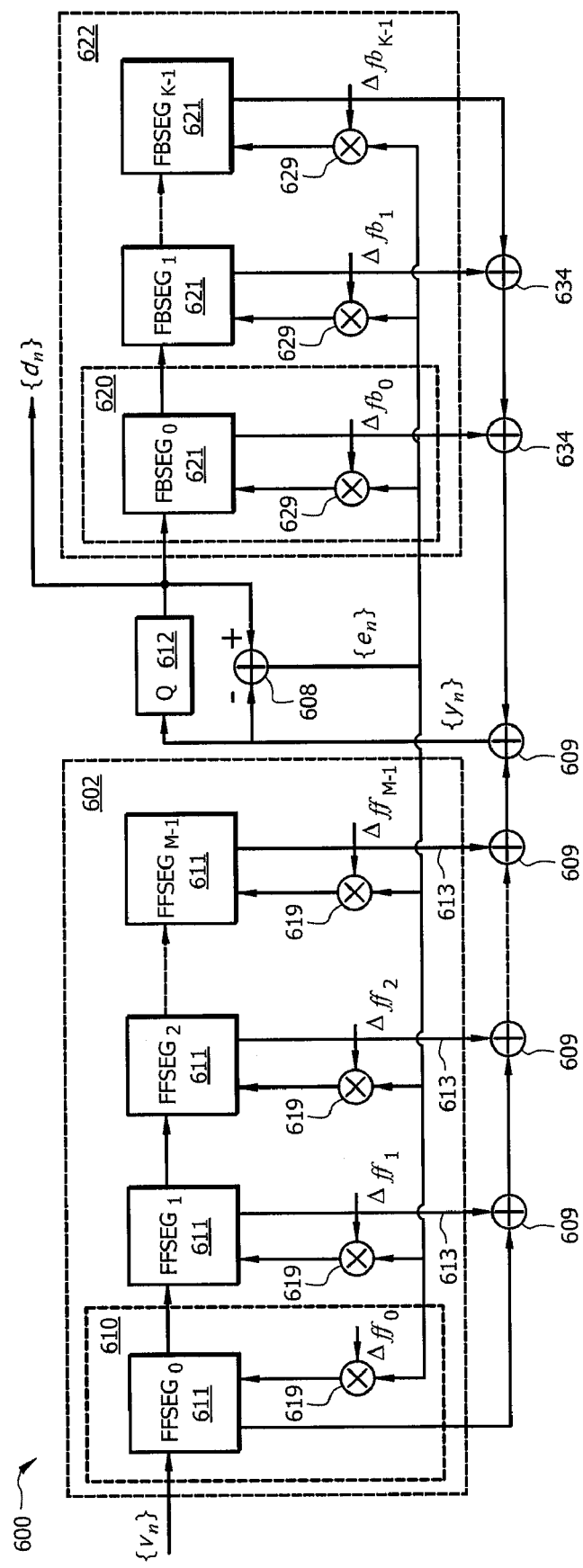
FIG. 6 shows a segmented decision feedback equalizer 600, in block diagram form and in accordance with another embodiment of the present invention.

FIG. 6 shows a segmented decision feedback equalizer 600, in block diagram form and in accordance with another embodiment of the present invention. In one example, the equalizer 600 is of an LMS type, however, other types of adaptive equalization techniques may be employed. Most of the structures to the left of the decision block 612 are the same as those of FIG. 5, and are referred to collectively as the feedforward section. Equalizer segments in that section are also referred to as feedforward segments. The equalizer 600 is shown to include a plurality of equalizer segments 602, having M equalizer segments 610, a plurality of feedforward summers 609, a difference operator 608, and a decision block 612. Each of the equalizer segments 610 is shown to include a multiplier 619 and an equalizer segment block 611, one output of which is fed to the next equalizer segment block. Each one of the multipliers 619 of the equalizer segments 610 is shown to use a feedforward step size $\Delta_{ff}$ and an error value, denoted by $\{e_n\}$ and multiplying these two to generate one of the inputs of the block 611 for coefficients update. There are M number of step sizes and equalizer segment blocks 611 shown with M being an integer value. Each of the equalizer segments 610 with one of the plurality of summers to which input is provided by a corresponding equalizer segment block 611 is referred to as an equalizer stage. Thus, there are M numbers of equalizer stages shown in FIG. 6.

The equalizer 600 includes two distinct sections 602 and 622, and the outputs of which are combined or added together, by the adder 609, before being quantized by the block Q 612 to generate the decision output of the equalizer 600, $\{d_n\}$. The first section of the equalizer 600, comprising the plurality of feedforward equalizer segments 602 is referred to as a feedforward section comprising a plurality of feedforward segments 610. The second section of the equalizer 600, comprising a plurality of decision feedback equalizer segments 622 and is referred to as a feedback section having a plurality of feedback segments 620, which are similar structurally as the segments of the feedforward section except that the delayed decisions instead of delayed sample inputs are stored in their delay elements. The outputs of the two sections are combined by the adder 609 to generate the input to the block Q 612 and to the difference operator 608.

The step sizes for the two sections are different in that there are M numbers of feedforward step sizes $\Delta_{ff}$ and K numbers of feedback step sizes $\Delta_{fb}$. The step sizes are generated by each segment similar to that discussed and shown relative to FIG. 5(a) and FIG. 5(b), and are multiplied by the multipliers 619 and 629 similar to the multipliers 514 of FIG. 5. That is, the step size of a particular equalizer stage is multiplied by a corresponding multiplier 619 of the same stage. The step sizes in each of the feedforward and feedback segments are controlled individually, as stated relative to FIGS. 5, 5(a) and 5(b). Each of the segment blocks 621 is coupled to receive the output of a previous segment block 621 except that the first segment block of the blocks 621 in the plurality of segments 622 is coupled to receive the output of the decision block Q 612. A plurality of decision feedback summers 634 is coupled to the plurality of segments 621 in a manner similar to the manner in which the summers 609 are coupled to the segments 611.

In FIG. 6, the number of equalizer segments in each of the feedforward and feedback sections may vary and need not be the same. The number of segments bears weight on the speed of convergence of the equalizer, as previously discussed relative to other figures.

The first equalizer segment 610 is shown to receive an input $\{v_n\}$ with being a time index for samples of an input signal v. The input $\{v_n\}$ is provided to the equalizer segment block 611 of the first equalizer segment 610. As earlier indicated, one of the outputs of each of the equalizer segment blocks 611 is provided as input to the next equalizer segment block 611 and yet another output of the equalizer segment block 611, the equalizer segment filter output 613 is provided as an input to a summer 609 of the same stage of equalizer segments except that the equalizer segment filter output 613 of the first stage of the equalizer segment 611 is provided to the summer 609 of the next stage. The output of each of the summers 609 is received as input by the summer 609 of a next equalizer stage with the output of the last stage summer being the filter output of the feedforward section. Each of the blocks 611 includes structures for performing equalizer segment filter and coefficient update functions similar to that discussed relative to the blocks 511. In fact, each of the blocks 611 is the same as the block 511. The output of the adder 609 of the last stage of the feedforward section is provided as one of the two inputs of an adder 609, which receives another input from the output of the last stage of the feedback sections and adds the two to generate an equalizer filter output $\{y_n\}$ serves as an input to the decision block Q 612 and to the difference operator 608 where it is subtracted from the decision output of the equalizer 600 $\{d_n\}$ to generate the equalizer error $\{e_n\}$. The equalizer 600, when implemented in BFP structure, operates in accordance with Eqs. (20)-(24) below.

Filter Equation:

$$y_{n,m} = \sum_{i=0}^{L-1} v_{n-i,m} c'_{i,m}$$ Eq. (20)

$$x_{n,l} = \sum_{i=1}^{L} d_{n-i,l} b'_{i,l}$$ Eq. (21)

The Combination Equation:

$$y_n = \sum_{m=0}^{M-1} y_{n,m}(a^{jm})^{-1} + \sum_{l=0}^{K-1} x_{n,l}(a^{jl})^{-1}$$ Eq. (22)

Error Equation:

$$e_n = d_n - y_n$$ Eq. (23)

Update Equations:

$$b'^{k+1}_{i,l} = b'^{k}_{i,l} + \Delta_{fbj} a^{jl} e_n d_{n-i,l}, \ i=1,\ldots,L, \ l=0,\ldots,K-1$$ Eq. (25)

Where M and K are the number of feedforward and feedback segments, respectively.

Similar discussions that led to Eq. (19) apply to DFE implementation as well. The resulting variations of Update Equations Eqs. (24), (25) for segmented BFP decision feedback equalizer are:

$$c'^{k+1}_{i,m} = c'^{k}_{i,m} + \Delta_{ffc} e_n v_{n-i,m}, \ i=0,\ldots,L-1, \ m=0,\ldots,M-1$$ Eq. (26)

$$b'^{K+1}_{i,l} = b'^{k}_{i,l} + \Delta_{fbc} e_n d_{n-i,l}, \ i=1,\ldots,L, \ l=0,\ldots,K-1$$ Eq. (27)

Where $\Delta_{ffc}$ and $\Delta_{fbc}$ are predetermined constant feedforward and feedback constant step sizes respectively.

Figure 7:
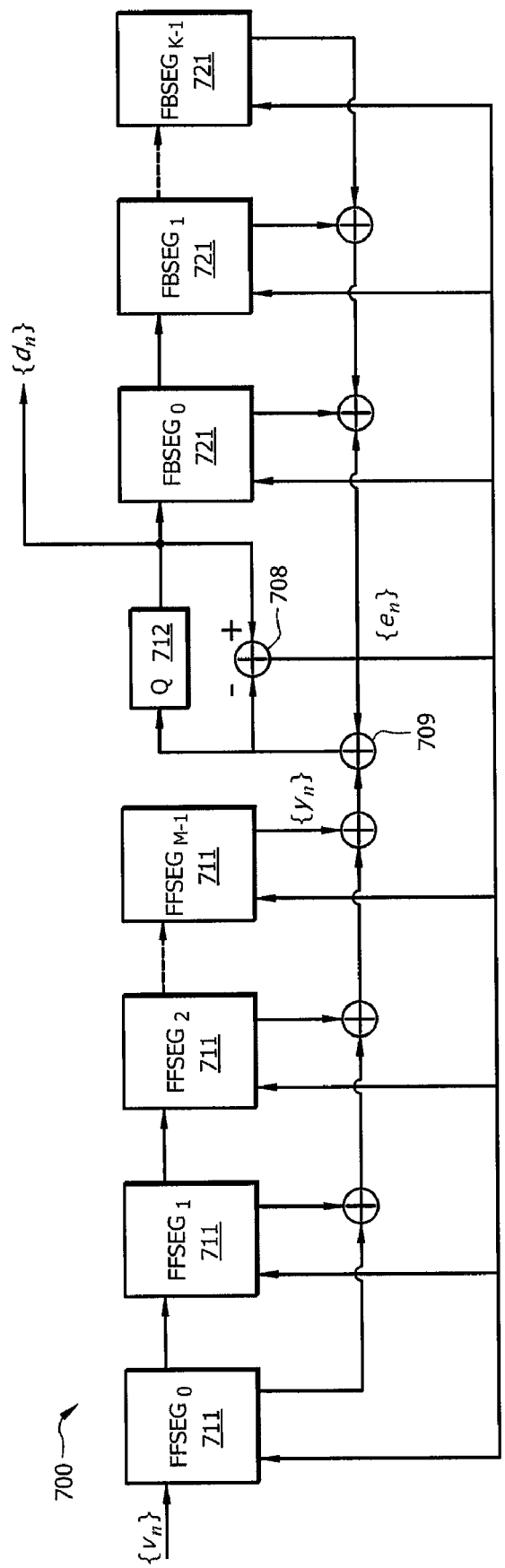
FIG. 7 shows a block diagram of a decision feedback equalizer 700 in accordance with another embodiment of the present invention.

Eqs. (20)-(23),(26),(27) are implemented by the segmented LMS decision feedback equalizer 700, in FIG. 7, in accordance with another embodiment of the present invention. FIG. 7 is similar to FIG. 6 except that the multipliers 614 are absent in FIG. 7 because the predetermined step sizes $\Delta_{ffc}$ and $\Delta_{fbc}$ remain constants during the coefficients update process and are implemented as fixed shifts inside the feedforward segment 711 and feedback segment 721 respectively. The input to the equalizer 700 is $\{v_n\}$ and its output is $\{d_n\}$ with $\{e_n\}$ being generated by the difference operator 708, similar to equalizers of other embodiments of the present invention discussed above.

Figure 8:
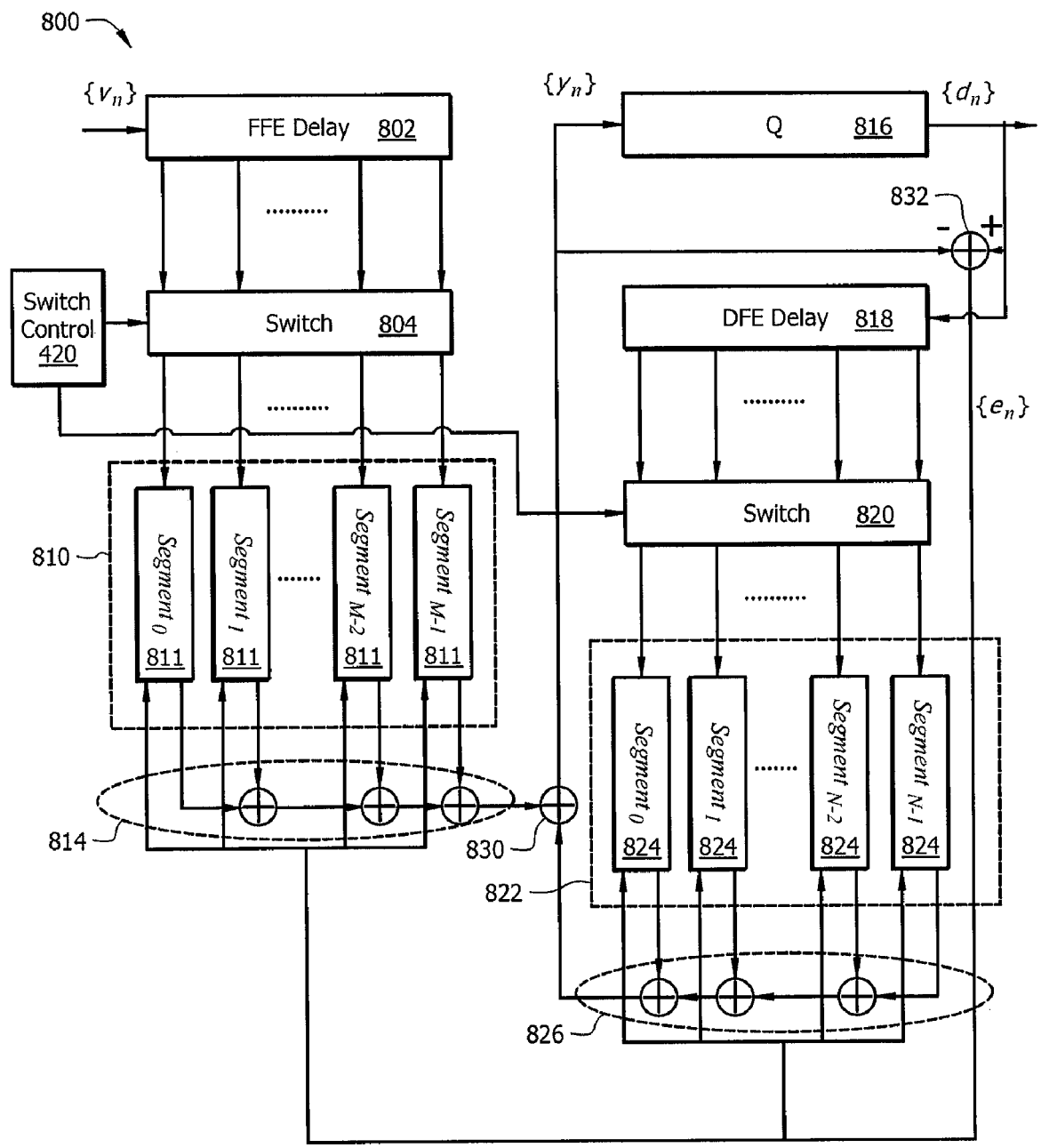
FIG. 8 shows a segmented sparse equalizer 800 in accordance with yet another embodiment of the present invention.

FIG. 8 shows a segmented sparse equalizer 800 in accordance with yet another embodiment of the present invention. In FIG. 8, the equalizer 800 is shown to include a feedforward delay line block 802, a switch 804, a switch control 806, a plurality of sparse feedforward equalizer segments 810, a plurality of feedforward summers 814, a decision block Q 816, a decision feedback equalization delay line block 818, a decision feedback switch 820, a plurality of sparse decision feedback equalizer segments 824, a plurality of decision feedback summers 826, a summer 830 and a difference operator 832.

In FIG. 8, the delay line block 802 is shown to receive an input to the equalizer 800, the input $\{v_n\}$ and generates multiple outputs, which are delayed versions of the sampled input $\{v_n\}$, to the switch 804, which is controlled by the switch control 806. The switch control 806 also controls the switch 820. The switch 804 selects a group of delayed samples corresponding to the locations of the effective coefficients and generates output to the plurality of feedforward segments 810, which includes segments 811, each segment being further discussed and shown relative to FIG. 8(a). The output of the plurality of segments 810 is provided to the summers 814. Specifically, the output of each of the segments 811 of the plurality of segments 810 is summed with the output of a previous stage summer with each stage being defined by segment 811 and an associated summer 814. The first segment 811 of the plurality of segments 810 generates an output that cannot be summed with a previous stage and is thus directly fed into the summer 814 of the next stage. The output of the last summer of the plurality of summers 814 is provided as one of the inputs of the summer 830 for summation thereof with the output of the last summer of the plurality of the summers 826 and the output of the summation is provided as input to the decision block Q 816, which produces the decision output of the equalizer 800, as the output $\{d_n\}$. The output $\{d_n\}$ is also shown provided to a difference operator 832. The output $\{d_n\}$ is shown subtracted by the output of the summer 830 to form equalizer error $\{e_n\}$ and the result thereof is provided to the plurality of segments 810 and the plurality of the segments 822. There are M feedforward segments 811 and N feedback segments 824 shown in FIG. 8.

In FIG. 8, the output $\{d_n\}$ is also shown provided as input to the delay line block 818, which produces input to the switch 820. That is, $\{d_n\}$ is delayed, at a symbol decision time per delay and the delayed versions of the $\{d_n\}$ is provided to the switch 820. The switch 820 generates an output to the plurality of feedback segments 822, which, in turn, provide input to corresponding summers 826. The output of the summer 832 is $\{e_n\}$. In FIG. 8, the switches 804 and 820 each selectively pass through to their respective segments, those delayed samples or decisions, from the blocks 802 and 818, respectively, that correspond to the locations of the effective coefficients.

Figure 8A:
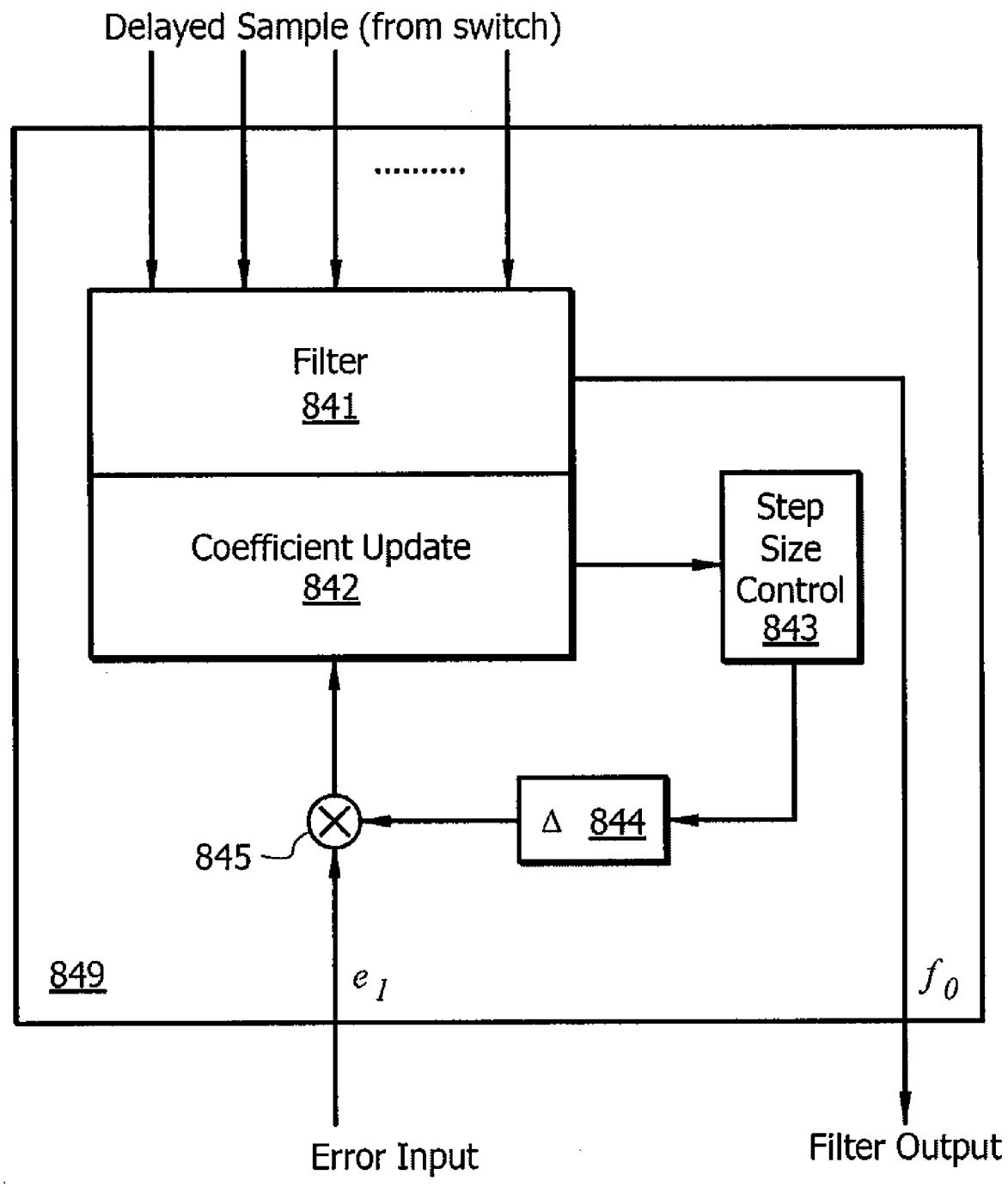

FIG. 8(a) shows further details, in block diagram form, of one of the segments 811 of the equalizer 800 of FIG. 8, which is the same as FIG. 5(a) without the delay line block 532. The segments 824 are similar to the segments 811 except that the Delayed Sample (provided as input to the filter 841) is replaced by Delayed Decision (from switch).

Although the segmented equalizer for FIR LMS equalizer is discussed in detail, applications to ZF and RLS equalizers, fractional spaced equalizer, as well as equalizer with complex data, or complex coefficients, or both, are anticipated. In addition, all equalizer segments do not need to have the same step size.

Each of the equalizer segments can have a different number of coefficients with each segment having a segment size L, which can be the same or a different value for each segment. The number of segments in a feedforward section or feedback section can be as small as two. An equalizer segment may have only one filter coefficient with L=1. Additionally, the equalizer segments may be a combination of different types, e.g., those depicted in FIG. 5(a) or FIG. 5(b), or other variations.

Thus, in accordance with the various embodiments of the present invention, including but not limited to the embodiments of FIGS. 5-8(a), an adaptive equalizer structure having equalizer segments is disclosed for particular suitability for multipath and fading channels, frequently seen in wireless data transmission environments. This segmented equalizer includes a group of equalizer segments working independently of each other. The filter outputs of these equalizer segments are then combined under a weighting criteria, as defined by the above-noted equations, to form a final equalizer filter output. This equalizer structure, when used in multipath and fading environment, has faster convergence, less self-noise, and lower implementation cost, all at the same time.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A segmented equalizer comprising:
a feedforward equalizer section having a plurality of feedforward equalizer segments, each of the plurality of feedforward equalizer segments including a feedforward equalizer segment block and a feedforward multiplier, each of the feedforward equalizer segment blocks responsive to a first input and a second input and except for a last one of the plurality of feedforward equalizer segment blocks operative to generate a first output and a second output, the last one of the plurality of feedforward equalizer segment blocks operative to generate a second output, the feedforward equalizer section further including a plurality of feedforward summers each of the feedforward summers operative to generate a feedforward summer output and responsive to a first feedforward summer input and a second feedforward summer input, a first one of the plurality of feedforward equalizer segment blocks responsive to delayed samples of an input signal $\{v_n\}$, wherein n is a time index for samples of an input signal v, each one of the multipliers of the plurality of feedforward equalizer segments being operative to multiply a feedforward step size, $\Delta_{f_m}$, where 'm' represents the number of feedforward equalizer segments and a respective error value of n number of error values, $\{e_n\}$, to generate a feedforward multiplier output, each of the plurality of feedforward equalizer segment blocks except the first one of the plurality of feedforward equalizer segment blocks responsive to the output of a preceding feedforward equalizer segment block as its first input and the multiplier output of the corresponding feedforward equalizer segment as its second input, the first output of each of the plurality of feedforward equalizer segment blocks, except for the last one of the plurality of feedforward equalizer segment blocks, coupled to the first input of a succeeding one of the plurality of feedforward equalizer segment blocks, the second outputs of the first and a second ones of the plurality of feedforward equalizer segment blocks coupled to the first and second inputs, respectively, of a first one of the plurality of feedforward summers, each of the plurality of the summers of the feedforward equalizer sections, except for the first feedforward summer, responsive to the feedforward summer output of a preceding feedforward summer and each of the plurality of the summers of the feedforward equalizer sections, except for the last feedforward summer, responsive to the second outputs of a respective one of the plurality of feedforward equalizer segment blocks, the output of the last summer being an equalizer filter output $\{y_n\}$, the last summer of the feedforward equalizer section being further responsive to a feedback equalizer section output;
a feedback equalizer section having a plurality of feedback equalizer segments, each of the plurality of feedback equalizer segments including a feedback equalizer segment block and a feedback multiplier, each of the feedback equalizer segment blocks responsive to a first input and a second input and except for a last one of the plurality of feedback equalizer segment blocks operative to generate a first output and a second output, the last one of the plurality of feedback equalizer segment blocks operative to generate a second output, the feedback equalizer section further including a plurality of feedback summers each of the feedback summers operative to generate a feedback summer output and responsive to a first feedback summer input and a second feedback summer input, a first one of the plurality of feedback equalizer segment blocks responsive to an equalizer output $\{d_n\}$, each one of the multipliers of the plurality of feedback equalizer segments being operative to multiply a feedback step size, $\Delta_{fb_l}$, where 'l' represents the number of feedback equalizer segments, and a respective error value of n number of error values, $\{e_n\}$, to generate a feedback multiplier output, each of the plurality of feedback equalizer segment blocks except the first one of the plurality of feedback equalizer segment blocks responsive to the output of a preceding feedback equalizer segment block as its first input and the feedback multiplier output of the corresponding feedback equalizer segment as its second input, the first output of each of the plurality of feedback equalizer segment blocks, except for the last one of the plurality of feedback equalizer segment blocks, coupled to the first input of a succeeding one of the plurality of feedback equalizer segment blocks, the second outputs of the last and a next-to-the-last ones of the plurality of feedback equalizer segment blocks coupled to a last one of the plurality of feedback summers, the last one of the plurality of feedback summers operative to add the last and the next-to-the-last ones of the plurality of feedback equalizer segment blocks to generate a last feedback summer output, the next-to-the-last feedback summer responsive to the last feedback summer output and the second output of a respective one of the plurality of feedback equalizer segment blocks and operative to add the last feedback summer output and the second output of a respective one of the plurality of feedback equalizer segment blocks to generate an input to the next feedback summer except if it is the first feedback summer in which case it generates a first feedback summer output which serves as an input to the last feedforward summer;

an adder responsive to the equalizer filter output $\{y_n\}$ and a decision block output and operative to subtract the equalizer filter output $\{y_n\}$ from the decision block output to generate the error values $\{e_n\}$; and a decision block responsive to the equalizer filter output $\{y_n\}$ and operative to quantize the same to generate the equalizer output $\{d_n\}$.

2. A segmented equalizer, as recited in claim 1, wherein the feedforward step size and the feedback step size are distinct.

3. A segmented equalizer, as recited in claim 1, wherein the segmented equalizer is a segmented sparse equalizer.

4. A segmented equalizer comprising:

a plurality of feedforward equalizer segments, each feedforward equalizer segment responsive to delayed samples of an input signal $\{v_n\}$, wherein n is an index of samples, and including a feedforward filter block for filtering the delayed samples by using coefficients which are updated based on a feedforward step size generated for each feedforward equalizer segment, each feedforward equalizer segment including a feedforward shift block coupled to receive input from the feedforward filter block and an exponent control block coupled to a feedforward coefficient update block and a feedforward step size control block for generating the feedforward step size, a different feedforward step size being generated for each feedforward equalizer segment;

a feedforward summer, coupled to receive the plurality of feedforward equalizer segment outputs $\{y_{n,m}\}$ and generate a feedforward equalizer filter output $\{y\_ff_n\}$;

wherein each of the feedforward equalizer segments is a block floating point feedforward equalizer segment including a feedforward delay line block for generating the delayed sample input by receiving sample inputs from a previous feedforward equalizer segment except a first feedforward equalizer segment, which receives input signal $\{v_n\}$ and provides the delayed samples to the feedforward filter block;

a plurality of feedback equalizer segments, each feedback equalizer segment responsive to the delayed equalizer decisions $\{dn\}$ and including a feedback filter block for filtering the delayed decisions by using coefficients which are updated based on a feedback step size generated for each feedback equalizer segment, wherein each feedback equalizer segment generates an output $\{x_{n,l}\}$, each feedback equalizer segment including a feedback shift block coupled to receive input from the feedback filter block and an exponent control block coupled to a feedback coefficient update block and a step size control block for generating a feedback step size, a different step size being generated for each segment;

a feedback summer, coupled to receive a plurality of feedback equalizer segment outputs $\{x_{n,l}\}$ and generate a feedback equalizer filter output $\{y\_fb_n\}$; and wherein each of the feedback equalizer segments is a block floating point feedback equalizer segment including a feedback delay line block for generating feedback delayed decisions by receiving decisions from a previous feedback equalizer segment except a first feedback equalizer segment which receives equalizer output $\{dn\}$, and providing the delayed decisions to the feedback filter block;

a first summer operative to add the feedforward equalizer filter output $\{y\_ff_n\}$ and the feedback equalizer filter output $\{y\_fb_n\}$ to generate the equalizer filter output $\{y_n\}$;

a decision block responsive to the equalizer filter output $\{y_n\}$ and operative to generate an equalizer output $\{dn\}$; and a second summer operative to subtract the equalizer filter output $\{y_n\}$ from the equalizer output $\{dn\}$ to generate an error $\{en\}$.

5. A segmented equalizer, as recited in claim 4, wherein the segmented equalizer is a segmented sparse equalizer.

6. A segmented equalizer, as recited in claim 4, including a first feedforward switch coupled to the plurality of feedforward equalizer segments for selectively providing non-zero delayed samples.

7. A segmented equalizer, as recited in claim 4, including a first feedback switch coupled to the plurality of feedback equalizer segments for selectively providing non-zero delayed samples.

8. A segmented equalizer, as recited in claim 4, wherein each of the feedforward filter blocks generates an output $y_{n,m}$ defined by:

$$y_{n,m} = \sum_{i=0}^{L-1} v_{n-i,m} c'_{i,m}$$

wherein $c'_{i,m}$ are coefficients for segment m and $v_{n-i,m}$'s are the delayed input signals for segment m.

9. A segmented equalizer, as recited in claim 8, wherein the output Combination Equation, i.e. generation of $y\_ff_n$, is:

$$y\_ff_n = \sum_{m=0}^{M-1} y_{n,m} (a^{j_m})^{-1}$$

Where $c'_{i,m} = c_{i,m} a^{j_m}$, a is the base for the BFP operation, $j_m$ is the exponent part for segment m, $a^{j_m}$ is the equivalent scaling for segment m, and its inverse $(a^{j_m})^{-1}$'s are combination weighting in forming the equalizer output.

10. A segmented equalizer, as recited in claim 9, wherein the feedforward coefficient update block performs a function implementing:

$$c'^{k+1}_i = c'^k_i + \Delta_m a^{j_m} e_n v_{n-i}.$$

11. A segmented equalizer, as recited in claim 4, wherein each of the feedback filter blocks generate an output $x_{n,l}$ defined by:

$$x_{n,l} = \sum_{i=1}^{L} d_{n-i,l} b'_{i,l}$$

wherein $b_{i,l}$ are coefficients, $d_{n-i,l}$ are decisions and $x_{n,l}$ are outputs of the feedback filter block for L samples.

12. A segmented equalizer, as recited in claim 11, wherein the output Combination Equation, i.e. generation of $y\_fb_n$, is:

$$y\_fb_n = \sum_{l=0}^{K-1} x_{n,l} (a^{j_l})^{-1}$$

Where a is the base for the BFP operation, $j_l$ is the exponent part for segment l, all $a^{j_l}$ is the equivalent scaling for segment l, and its inverse $(a^{j_l})^{-1}$'s are combination weighting in forming the equalizer output.

13. A segmented equalizer, as recited in claim 12, wherein the feedback coefficient update block performs a function implementing:

$$b'^{k+1}_{n-i} = b'^k_i + \Delta_l a^{j_l} e_n d_{n-i}.$$

14. A method of equalizing samples of an input signal $\{v_n\}$, wherein n is a time index for samples of an input signal v, comprising:

receiving samples of an input signal $\{v_n\}$, wherein n is a time index for samples of an input signal v, by a feedforward equalizer section of a segmented equalizer, the feedforward equalizer section having a plurality of feedforward equalizer segments, each of the plurality of feedforward equalizer segments including a feedforward equalizer segment block and a feedforward multiplier;

delaying the input signal $\{v_n\}$ by a delay time associated with each of the plurality of feedforward equalizer segment blocks such that the input signal is delayed an M number of times, M being an integer, after being received by a last one of the plurality of feedforward equalizer segment blocks;

multiplying each of a plurality of feedforward step sizes, $\Delta_{ff_i}$, and a respective error value of n number of error values, $\{e_n\}$, to generate a plurality of feedforward multiplier outputs;

receiving each of the plurality of feedforward multiplier outputs by a respective one of the plurality of feedforward equalizer segment blocks;

summing the output of each of the plurality of the feedforward equalizer segment blocks, except for the outputs of the first and second feedforward equalizer segment blocks, with the output of a preceding feedforward summer;

summing the output of the first and second feedforward equalizer segment blocks;

summing the output of the last feedforward summer and a feedback equalizer section output to generate a feedforward equalizer filter output $\{y\_ff_n\}$; summing the feedforward equalizer filter output $\{y\_ff_n\}$ and a feedback equalizer filter output $\{y\_fb_n\}$ to generate the equalizer filter output $\{y_n\}$;

quantizing the equalizer filter output $\{y_n\}$ to generate equalizer output $\{d_n\}$;

subtracting the equalizer filter output $\{y_n\}$ from the equalizer output $\{d_n\}$ to generate the error values $\{e_n\}$;

receiving the equalizer output $\{d_n\}$, by a feedback equalizer section of a segmented equalizer, the feedback equalizer section having a plurality of feedback equalizer segments, each of the plurality of feedback equalizer segments including a feedback equalizer segment block and a feedback multiplier;

delaying the received equalizer output $\{d_n\}$ by a delay time associated with each of the plurality of feedforward equalizer segment blocks such that the input signal is delayed an M number of times, M being an integer, after being received by a last one of the plurality of feedback equalizer segment blocks;

multiplying each of a plurality of feedback step sizes, $\Delta_{fb_i}$, and a respective error value of n number of error values, $\{e_n\}$, to generate a plurality of feedback multiplier outputs, the feedback step sizes being different than the feedforward step sizes;

receiving each of the plurality of feedback multiplier outputs by a respective one of the plurality of feedback equalizer segment blocks;

summing the output of each of the plurality of the feedback equalizer segment blocks, except for the outputs of the last and next-to-the-last feedback equalizer segment blocks, with the output of a preceding feedback summer, the output of the first feedback summer being the feedback equalizer filter output; and summing the output of the last and next-to-the-last feedback equalizer segment blocks and providing the sum to a preceding feedback summer.

* * * * *